United States Patent
Wu

(10) Patent No.: US 8,837,628 B2
(45) Date of Patent: Sep. 16, 2014

(54) METHOD OF TRANSMISSION THROUGH SINGLE WIRE

(75) Inventor: Tsung-Nan Wu, Zhubei (TW)

(73) Assignee: Richtek Technology Corporation, Hsin-Chu (TW)

( * ) Notice: Subject to any disclaimer, the term of this patent is extended or adjusted under 35 U.S.C. 154(b) by 35 days.

(21) Appl. No.: 13/527,515

(22) Filed: Jun. 19, 2012

(65) Prior Publication Data

US 2013/0336420 A1    Dec. 19, 2013

(51) Int. Cl.
*H04L 27/00* (2006.01)

(52) U.S. Cl.
USPC .......... 375/295; 375/296; 375/316; 375/340; 375/146; 375/147

(58) Field of Classification Search
CPC ... H04L 1/0003; H04L 1/0071; H04L 5/0007; H04L 1/0009; H04L 27/0008

USPC ................ 375/295, 147, 148, 296, 316, 340; 713/500, 502

See application file for complete search history.

(56) References Cited

U.S. PATENT DOCUMENTS

| | | | |
|---|---|---|---|
| 7,080,266 B2 | 7/2006 | D'Angelo et al. | |
| 7,127,631 B2 | 10/2006 | D'Angelo et al. | |
| 8,489,947 B2 * | 7/2013 | Sunter | 714/726 |
| 8,539,275 B2 * | 9/2013 | D'Angelo et al. | 713/500 |
| 2011/0095624 A1 * | 4/2011 | Kung et al. | 307/130 |

* cited by examiner

*Primary Examiner* — Dhaval Patel
(74) *Attorney, Agent, or Firm* — Tung & Associates

(57) ABSTRACT

The invention provides a method of transmission through single wire. The method includes receiving a single-wire signal through a single wire; identifying a start code of the single-wire signal; after identifying the start code, counting a rising edge, a falling edge, or both rising edge and falling edge of the single-wire signal in at least one bit transmission period having a fixed length, to generate a count code; and decoding the count code to generate transmitted information.

11 Claims, 3 Drawing Sheets

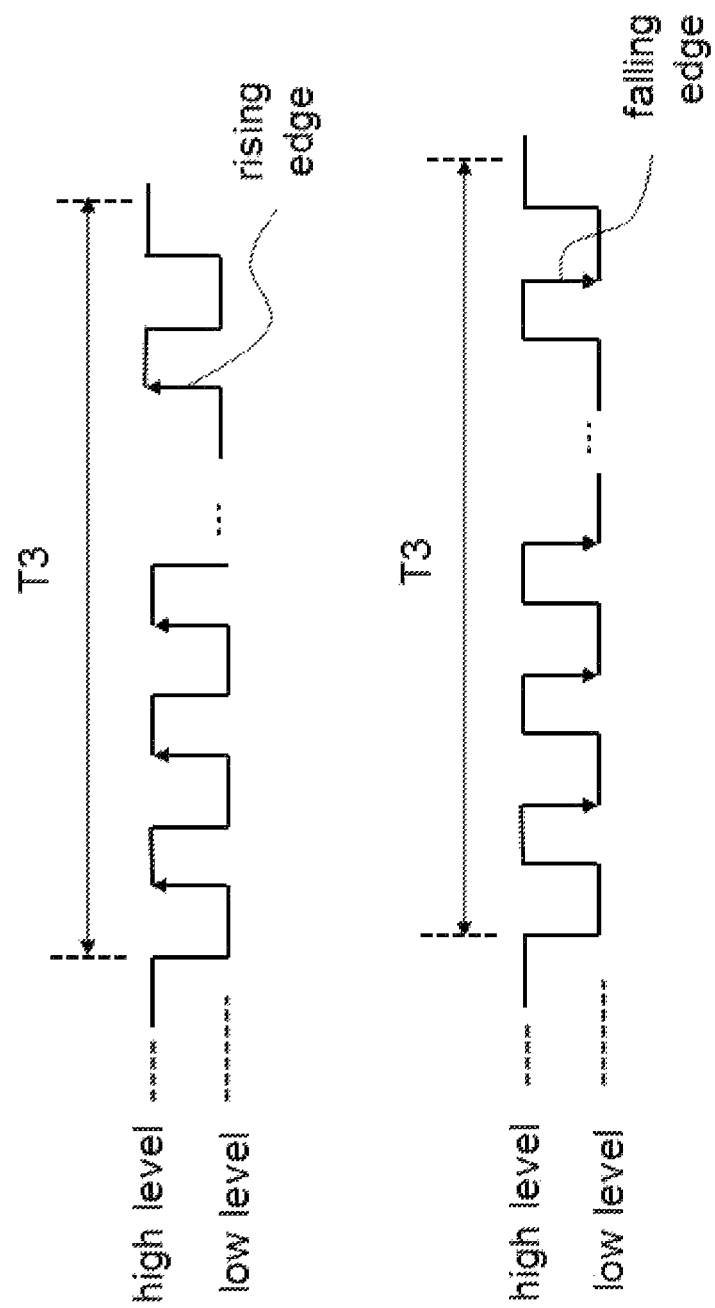

METHOD OF TRANSMISSION THROUGH SINGLE WIRE

BACKGROUND OF THE INVENTION

1. Field of Invention

The present invention relates to a method of transmission through single wire, especially a method using simple signal transmission protocol to transmit complicated information through single wire.

2. Description of Related Art

For communication between two circuits such as between a power management device and another device, popular communication interfaces such as I2C, SPI, and SMBUS require at least two wires, one for data and another for clock signal. It would be beneficial if data and clock signal can be transmitted by one single wire, because the circuit pin number can be reduced, and it is not necessary to synchronize the clock signals between the receiving circuit and the transmitting circuit. U.S. Pat. Nos. 7,127,631 and 7,080,266 disclose a single wire transmission method as shown in FIG. 1, wherein when the receiving circuit detects a rising edge of the signal EN/SET transmitted through the signal wire, it is enabled to receive data as shown by the signal ENABLE, and the receiving circuit generates a clock signal (CLOCK) according to the signal EN/SET. A counter of the receiving circuit begins to count the rising edges (1~n) of the signal EN/SET. When the receiving circuit detects a falling edge of the signal EN/SET, it begins to count a time-out period. If no rising edge is detected within the time-out period, the signal ENABLE is stopped; the counter is reset, and the clock signal CLOCK is stopped.

The aforementioned prior art patents count the rising edges from low level to high level, and the count represents the transmitted information. Thus, to transmit a number n, n rising edges have to be transmitted. The larger the transmitted number is, the more rising edges are needed, and the transmission period (bit length) is longer. Apparently, this method is inconvenient for transmitting a very large number, and because the length of the transmission period is not fixed, it causes some problems in certain applications.

In view of foregoing, the present invention provides a method of transmission through single wire, which is capable of transmitting complicated information through single wire by simple protocol.

SUMMARY OF THE INVENTION

In one perspective, the present invention provides a method of transmission through single wire, which includes: receiving a single-wire signal through a single wire, wherein the single-wire signal includes a plurality of rising edges and a plurality of falling edges; identifying a start code of the single-wire signal; after identifying the start code, counting a number of rising edge(s), falling edge(s), or both rising edge (s) and falling edge(s) of the single-wire signal in at least one bit transmission period having a fixed length, to generate a count code; and decoding the count code to generate transmitted information.

In the foregoing method, plural bit transmission periods can be transmitted, and each bit transmission period represents a bit.

In another perspective, the present invention provides a method of transmission through single wire, which transmits a single-wire signal to a receiving circuit through a single wire. The single-wire signal includes: a start code; a plurality of bit transmission periods, each bit transmission period representing a bit and including at least one level switching to represent a count code; and a transmission end code.

According to one preferable embodiment of the present invention, the start code can be a rising edge or falling edge of the single-wire signal.

In a preferable embodiment of the present invention, the count code is decoded to obtain a digital 1 or 0 according to whether the count code is even or odd, respectively, or is decoded to obtain a digital 0 or 1 according to whether the count code is even or odd, respectively.

In a preferable embodiment of the present invention, a number represented by a notation higher than binary notation can be transmitted in a bit transmission period.

In a preferable embodiment of the present invention, the single-wire signal further includes a transmission end code; the transmission end code includes a high level or a low level which lasts for a predetermined time period, wherein the predetermined time period starts from an end of the last bit transmission period, or from a rising edge of the plurality of rising edges or a falling edge of the plurality of falling edges.

In a preferable embodiment of the present invention, no clock information is required in the single-wire transmission.

In a preferable embodiment of the present invention, the transmitted information includes one of a command, an address, and read/write data, or a combination thereof.

The objectives, technical details, features, and effects of the present invention will be better understood with regard to the detailed description of the embodiments below, with reference to the drawings.

BRIEF DESCRIPTION OF THE DRAWINGS

FIG. 3 shows rising edges and falling edges of the single-wire signals according to the present invention.

DESCRIPTION OF THE PREFERRED EMBODIMENTS

The drawings as referred to throughout the description of the present invention are for illustration only, but not drawn according to actual scale.

The present invention provides a method of transmission through single wire, which includes: receiving a single-wire signal through a single wire, wherein the single-wire signal includes plural rising edges and plural of falling edges; identifying a start code of the single-wire signal; after identifying the start code, counting a number of rising edge(s), falling edge(s), or both rising edge(s) and falling edge (s) of the single-wire signal in at least one bit transmission period having a fixed length, to generate a count code; and decoding the count code to generate transmitted information.

Figure 1:
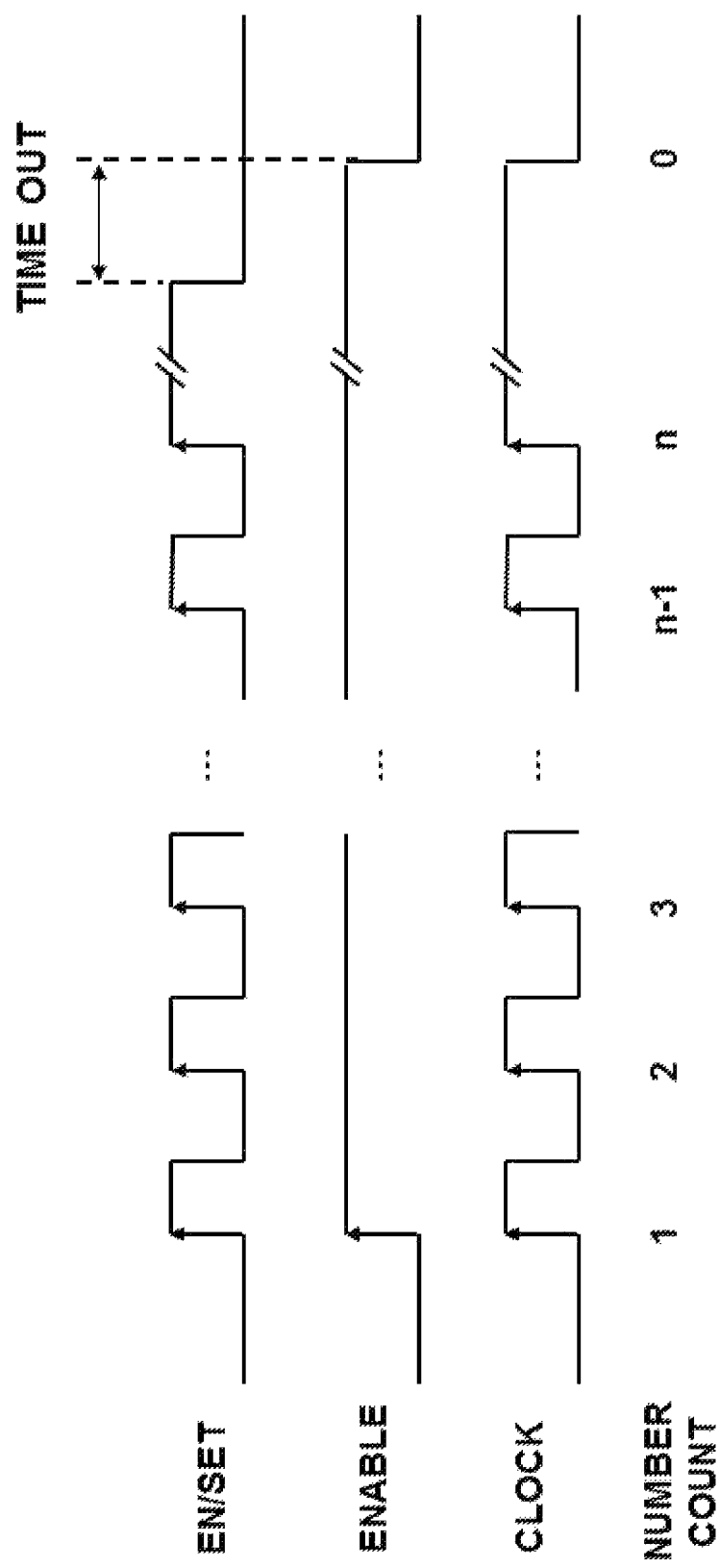
FIG. 1 shows a prior art method of sequential transmission through single wire.
Figure 2:
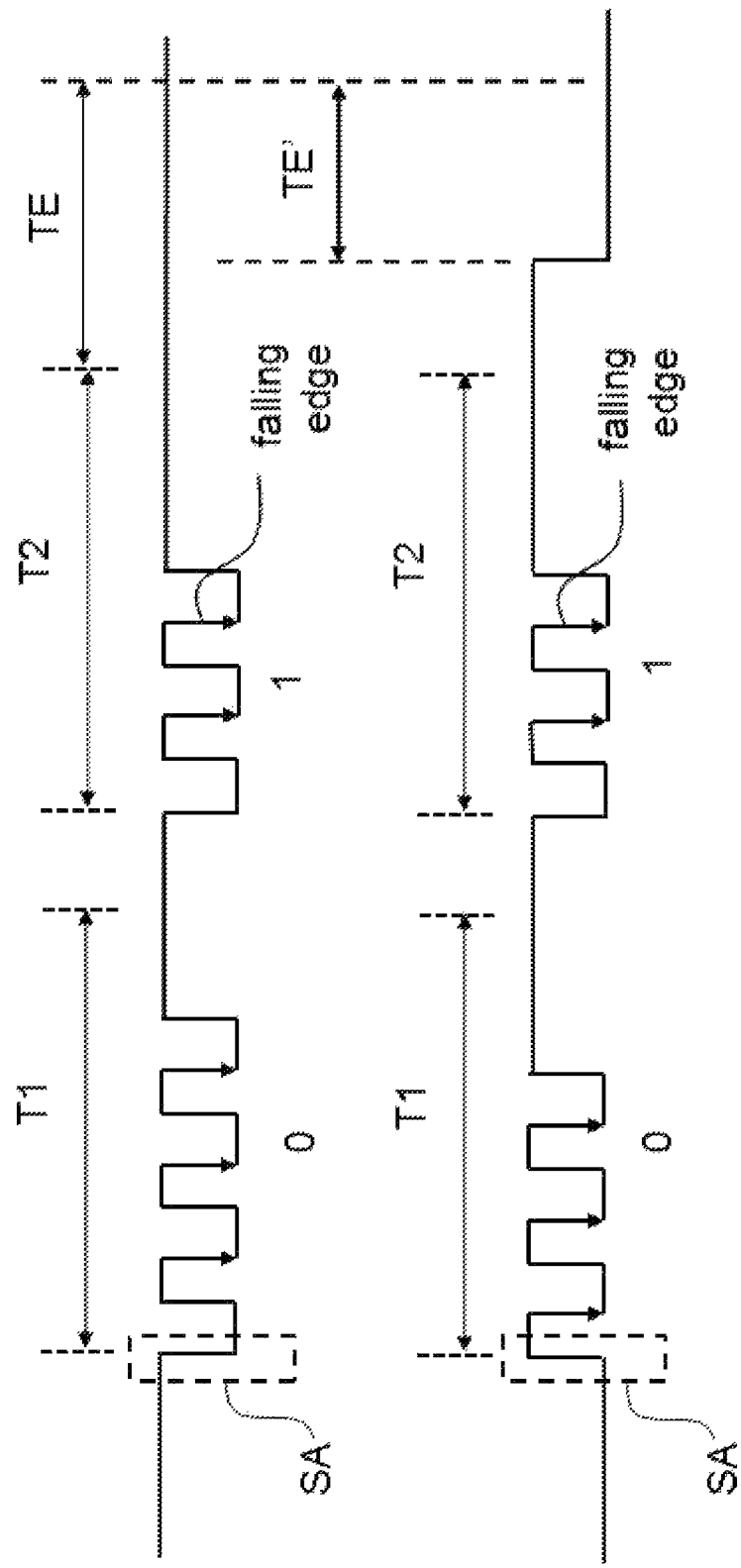
FIG. 2 shows two embodiments of the single-wire signals according to the present invention.

FIG. 2 shows two preferable embodiments of a single-wire signal received by a receiving circuit. The two preferable embodiments are different from each other in their background levels: one with a background of high level, and the other with a background of low level. The single-wire signal includes a start code SA which indicates a start of the signal transmission. The start code SA for example can be a rising edge or a falling edge of the single-wire signal; of course, other more complicated forms can be options to define the start code. In the embodiment shown at the upper part of FIG. 2, the start code SA is represented by a falling edge. In contrast, in the embodiment shown at the lower part of FIG. 2, the start code SA is represented by a rising edge. After indentifying the start code SA, a receiving circuit (not shown in figure) counts the number of level switching(s) (which may be rising edge(s), or falling edge(s), or both rising edge (s) and falling edge (s) of the single-wire signal) in a first bit transmission period T1 having a fixed length, to generate a count code. In both of the two embodiments shown in FIG. 2, the receiving circuit counts the falling edge(s), which are only examples and the receiving circuit certainly can count rising edges or both rising edge(s) and falling edge(s). The obtained count can be encoded and decoded in various ways, which will be described in more detail later. The single-wire signal can include more than one bit; as an example, the single-wire signals shown in FIG. 2 include two bits which are respectively transmitted in bit transmission periods T1 and T2 (both having the same fixed length). The single-wire signal preferably includes a transmission end code to indicate an end of the transmission. In one embodiment, the transmission end code uses time-out mechanism, i.e., if there is no level switching in a period of time, it indicates the end of the transmission. Referring to the upper part of FIG. 2, in this example, the transmission end code is expressed by a time-out period TE in which there is no level switching, wherein the time-out period TE starts from the end of a bit transmission period (T2 in the shown example). Or, referring to the lower part of FIG. 2, the transmission end code is expressed by a time-out period TE' in which there is no level switching, wherein the time-out period TE' starts from a level switching (a rising or falling edge, in this example a falling edge). The signal can stay at either high or low level during the time-out period.

In the bit transmission period, the obtained count can be regarded as a code (count code) which can be encoded and decoded in various ways. One such way is to decode the count code into binary information; for example, the count code can be decoded as a binary 0 when the count of falling edges of the single-wire signal is odd, and the count code can be decoded as a binary 1 when the count of falling edges is even. Or, it can certainly be arranged otherwise such that the count code is decoded as a binary 1 when the count of falling edges is odd, and the count code is decoded as a binary 0 when the count of falling edges is even. In the two embodiments shown in FIG. 2, in the first bit transmission period T1, the count of falling edges of the single-wire signal is 3 (odd number), so the count code can be decoded as a binary 0. In the second bit transmission period T2, the count of falling edges of the single-wire signal is 2 (even number), so the count code can be decoded as a binary 1. Thus, the single-wire signal can include binary information of 0's and 1's. It should be noted that the single-wire signal is shown to include only two bit transmission periods in FIG. 2, but this is only an example; the single-wire signal can certainly include only one bit transmission period or more bit transmission periods, which should all belong to the scope of the present invention.

The count code can be encoded and decoded in other ways. For example, the count of falling edges of the single-wire signal in the first bit transmission period T1 is 3, and this number (3) can be defined as a specific command, address, or read/write data. Or, the number (3) times can be used to represent an integer, such as 2 (the number 1 to represent the integer 0). Every bit transmission period can represent a bit, and the bit is not limited to a bit expressed by binary notation, that is, the bit can be a number expressed by a notation higher than binary notation. In this regard, different from the prior art U.S. Pat. Nos. 7,127,631 and 7,080,266, the bit transmission period of the present invention has a fixed length, and a large number can be encoded with plural count codes (combination of plural bit transmission periods). Combination of two or more bit transmission periods can be used to define desired information such as commands, addresses, read/write data, or combinations thereof.

The count code can be obtained by counting the rising edge(s) or both rising and falling edge(s) of the single-wire signal instead of the falling edge(s). Referring to FIG. 3, in the fixed time period T3, the count code can be obtained by counting the rising edge(s), falling edge(s), or both edges of the single-wire signal no matter the background level is high level or low level. The above-mentioned principles can be applied here with respect to encoding/decoding, definition of binary 0/1, count code, and the meaning of combination of count codes, etc.

As described in the above, the present invention can transmit complicated information by a single wire without clock information (i.e., no other wire is required for transmitting the clock information). In comparison with the prior art, the present invention requires shorter transmission time for transmitting a large number, and the transmission period has a fixed length. If the number of the transmitted bits is fixed, then the total transmission time is also fixed; this is advantageous in many applications.

In one embodiment of the present invention, for communication between devices, the transmitted information can be arranged to include a command, an address, read/write data, or a combination thereof. For example, it can be so arranged that in each transmission, 1st~mth bits represent command, (m+1)th~(m+1+n)th bits represent address, and (m+1+n+1)th~(m+1+n+1+p)th bits represent read/write data, etc.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, the start code can instead be defined as two sequential rising edges, or the transmission end code can instead be defined as a combination of one rising edge and one falling edge, etc. In view of the foregoing, the spirit of the present invention should cover all such and other modifications and variations, which should be interpreted to fall within the scope of the following claims and their equivalents.

What is claimed is:

1. A method of transmission through single wire, comprising:
   receiving a single-wire signal through a single wire, wherein the single-wire signal includes a plurality of rising edges and a plurality of falling edges;
   identifying a start code of the single-wire signal;
   after identifying the start code, counting a number of rising edge(s), falling edge(s), or both rising edge(s) and falling edge(s) of the single-wire signal in at least one bit transmission period having a fixed length, to generate a count code, wherein each bit transmission period represents one bit of the single-wire signal; and
   decoding the count code to generate transmitted information,
   wherein the count code is decoded to obtain a digital 1 or 0 according to whether the count code is even or odd, respectively, or is decoded to obtain a digital 0 or 1 according to whether the count code is even or odd, respectively.

2. The method of claim 1, wherein the start code is a rising edge of the plurality of rising edges or a falling edge of the plurality of falling edges of the single-wire signal.

3. The method of claim 1, wherein plural bit transmission periods are transmitted.

4. The method of claim 1, wherein a number represented by a notation higher than binary notation is transmitted in a bit transmission period.

5. The method of claim 1, wherein the single-wire signal further includes a transmission end code, the transmission end code including a high level or a low level which lasts for a time-out period, wherein the time-out period starts from an end of the bit transmission period, or from a rising edge of the plurality of rising edges or a falling edge of the plurality of falling edges.

6. The method of claim 1, wherein the transmitted information comprises a command, an address, read/write data, or a combination thereof.

7. A method of transmission through single wire, comprising:
   transmitting a single-wire signal to a receiving circuit through a single wire, the single-wire signal including:
   a start code;
   a plurality of bit transmission periods having a same fixed length, each bit transmission period representing a bit and including at least one level switching to represent a count code; and
   a transmission end code,
   wherein the count code is decoded to obtain a digital 1 or 0 according to whether the count code is even or odd, respectively, or is decoded to obtain a digital 0 or 1 according to whether the count code is even or odd, respectively.

8. The method of claim 7, wherein the start code is a rising edge or falling edge of the single-wire signal.

9. The method of claim 7, wherein a number represented by a notation higher than binary notation is transmitted in a bit transmission period.

10. The method of claim 7, wherein the transmission end code includes a high level or a low level which lasts for a time-out period, wherein the time-out period starts from an end of a last one of the plurality of bit transmission periods, or from a rising edge or a falling edge.

11. The method of claim 7, wherein the transmitted information includes one of a command, an address, read/write data, or a combination thereof.

\* \* \* \* \*